Oct. 2, 1951
H. RIVERS
2,570,179
DEVICE FOR FLUID FLOW BETWEEN RELATIVELY MOVING OBJECTS
Filed May 7, 1947
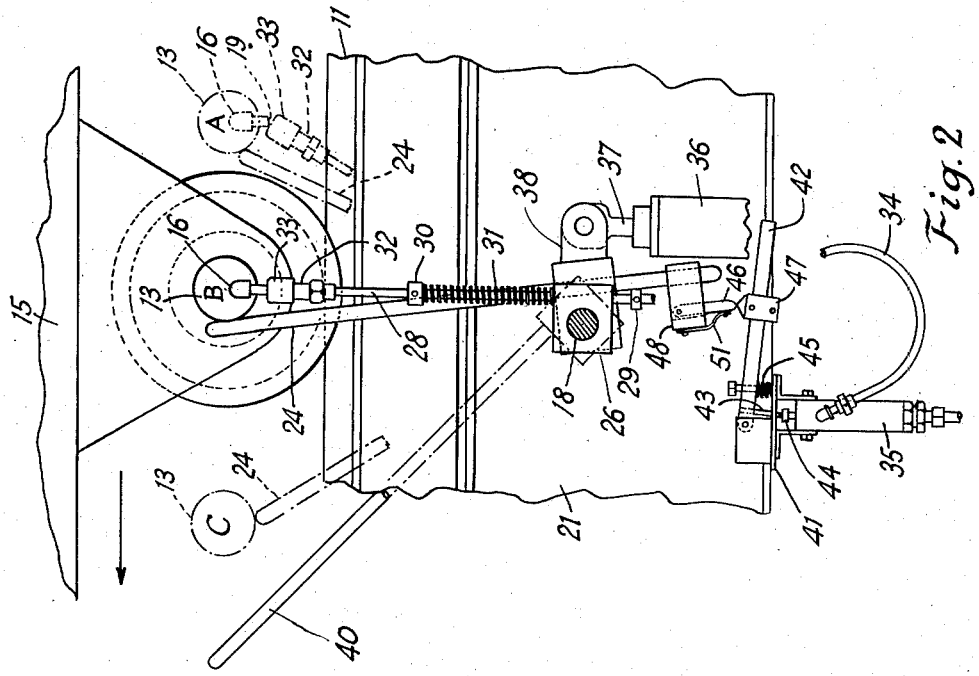
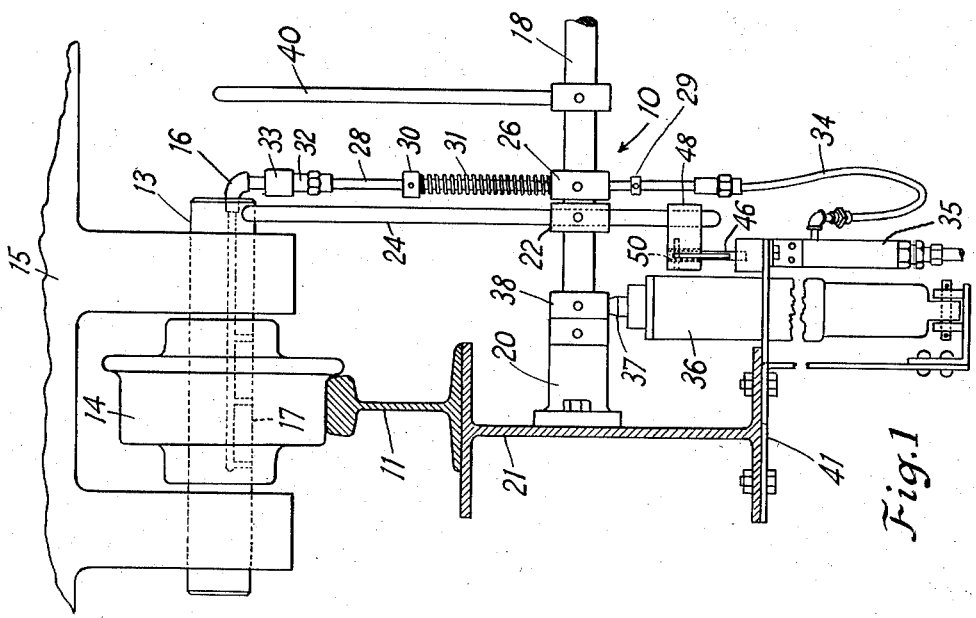
INVENTOR
Heyward Rivers
BY
*JPMoran*
ATTORNEY Patented Oct. 2, 1951

2,570,179

UNITED STATES PATENT OFFICE 2,570,179

DEVICE FOR FLUID FLOW BETWEEN RELATIVELY MOVING OBJECTS

Heyward Rivers, Augusta, Ga., assignor to The Babcock & Wilcox Company, Rockleigh, N. J., a corporation of New Jersey Application May 7, 1947, Serial No. 746,570

6 Claims. (Cl. 184—2)

1

The present invention relates to apparatus for the metered flow of fluids between relatively moving objects during periods of intermittent fluid flow connection, and more particularly to an automatic lubricator arranged to effect a pressure retaining fluid conduit connection between a lubricant supply source and a moving receiver so that a metered flow of lubricant is delivered to each of a successive series of receivers during the period of individual connection with the lubricant source.

In transmitting a flow of fluid between relatively moving objects the problem is to provide a temporary pressure retaining fluid flow connection between the objects and to cause a flow of fluid therebetween during the period of fluid flow connection. For example, this problem occurs in the lubrication of car journals when the cars are used in a tunnel kiln process. In this type of operation a positive and accurate lubrication of the car journals is desirable to avoid car breakdowns and resulting interruptions in the continuous process. Manual lubrication of kiln car journals has proven unsatisfactory and is undoubtedly due to the inaccessibility of the car journals for lubrication, temperature conditions and the human element.

It is therefore the main object of the present invention to provide apparatus of the type described which is characterized by a positive metered delivery of fluid between relatively moving positions of a source of fluid and a fluid receiver. A further and more specific object is to provide a lubricator capable of delivering a metered quantity of lubricant to the wheel journals of cars moving past the lubricator. An additional object is to provide a fluid connection between relatively moving objects which utilizes the relative movement to obtain a pressure retaining fluid flow connection between the objects with the relative movement therebetween actuating a valve for a metered flow of fluid through the fluid flow connection.

The various features of novelty, which characterize my invention, are pointed out with particularity in the claims annexed to and forming a part of this specification. For a better understanding of the invention, its operating advantages and specific objects attained by its use, reference should be had to the accompanying

2 drawings and descriptive matter in which I have illustrated and described a preferred embodiment of my invention.

Of the drawings:

Fig. 1 is a front elevation view, partly in section, of a lubricator constructed in accordance with the present invention; and Fig. 2 is a side elevation view of the lubricator.

The device hereinafter described can be used to transmit a metered flow of substantially any fluid between relatively moving objects. It is immaterial whether the source of the fluid supply or the fluid receiver is moving or stationary, or, alternately both may be in movement, as long as there is relative motion between the source of supply and the fluid receiver. In accordance with my invention I provide apparatus that utilizes the relative movement between the fluid supply source and the fluid receiver to obtain a pressure retaining fluid flow connection therebetween and to actuate a valve regulating fluid flow through the fluid flow connection. The apparatus is particularly advantageous in the periodic lubrication of a plurality of moving parts which are moved past a fixed lubricator position.

As shown in the drawings, a lubricator is arranged to supply a lubricant, such as grease or oil, successively to the wheel journals of a series of tunnel kiln cars. The car is of the type used in the continuous calcining of refractory products wherein a series of cars are loaded with refractory shapes and drawn through a calcining zone in the tunnel kiln at a substantially uniform rate of movement. Ordinarily in calcining refractory products, the time temperature relationship necessary for a high quality refractory product necessitates a relatively slow rate of car movement through the kiln. A typical rate of car movement is approximately 25 to 30 feet per hour. After the finished product has been unloaded from the car, the car is returned to the kiln entrance for reloading and a repetition of the calcining process. While the journals of a typical tunnel kiln car are not usually exposed to the high calcining temperatures within the kiln, the temperature in the vicinity of the wheels is sufficient to require a replenishment of the lubricant for each trip of the car through the tunnel kiln.

For purposes of illustrating the arrangement and the mode of operation of the present invention, a lubricator is shown in its relationship with one wheel of a typical tunnel kiln car. The opposite wheel of the car is served by a separate lubricator arranged to operate in conjunction with the lubricator shown and hereinafter described. The lubricator 10 may be conveniently installed between the car rails 11 in a pit at either end of a tunnel kiln, or if desired, within the kiln. A typical kiln car is provided with four wheels individually mounted for rotation on short axles, and has a wheel base of approximately 4 feet. With a short wheel-base car, the lubricator is arranged with a quick return mechanism so that it will be in position to lubricate the following pair of wheels immediately after the leading wheels are serviced.

The axle 13 of each wheel 14 is non-rotably fixed in position relative to the car 15 and is provided with a well known type of hydraulic lubrication fitting 16 which projects from the inner end of the axle 13 and faces vertically downward. The fitting is constructed with an integral check-valve which is arranged to open on the application of lubricant pressure thereto and to close on the removal of the pressure. Such a fitting is capable of effecting a pressure retaining flow connection with a complementary fitting in engagement therewith even though the axes of the fittings are displaced as much as 15°, at their point of intersection. The fitting 16 is in communication with the bearing surface 17 of the wheel through a connecting passage in the car wheel axle.

A shaft 18 is rotatably mounted in a bearing 20 which is secured on a beam 21 supporting the car rail 11 with the opposite end of the shaft similarly mounted in a bearing secured to the beam supporting the companion rail (not shown). The shaft 18 is positioned with its axis normal to the rails and substantially parallel to the car axle 13. A mounting block 22 is slideably fitted upon the shaft 18 and held in position by a set screw. The block 22 is provided with a bore at right angles to the shaft for a sliding fit with a guide rod 24. The rod is adjusted as hereinafter described and held in the block by a set screw. A second block 26, similar to the block 22, is slideably mounted on the shaft 18 and positioned thereon by a set screw. This block is likewise provided with a bore at right angles to the shaft for a sliding fit therethrough of a lubricant supply pipe 28.

The pipe 28 is provided with a fixed position collar 30 near its upper end and is encircled by a coil spring 31 which bears at one end against the surface of the collar and at its opposite end upon the surface of the block 26. The upper end of the pipe 28 is provided with a well known type of hydraulic fitting 32 and a coupling guide member 33. The fitting 32 is arranged to match the fitting 16 on the axle 13 so that as the two fittings are forced together they form a pressure retaining connection for the flow of lubricant therethrough. The coupling guide member 33 encircles the fitting 32 and is provided with a frusto-conical internal shape having a base angle of approximately 30°. The guide member is arranged to guide the fittings 16 and 32 into contact so as to assure an engaging relationship therebetween for the flow of lubricant. The pipe 28 extends below the block 26 and is provided with an elbow connection and a flexible metal hose 34 leading to a lubricant control valve 35 supported and arranged as hereinafter described. A collar 29 is adjustably mounted upon the lower portion of the pipe 28 so that contact between the collar 29 and the lower surface of the block 26 determines the upwardly projected length of the pipe 28 above the block. The control valve is connected with a lubricant reservoir (not shown) of well known type which is maintained at a substantially uniform pressure for the delivery of lubricant in response to the opening of the valve.

The guide rod and the lubricant supply pipe are arranged and spaced so that upon movement of a kiln car over the lubricator, the guide rod 24 will contact the surface of the axle 13 and on movement of the kiln car, the shaft 18 will rotate to follow the car movement until contact between the rod and the axle are lost. When the rod first contacts the axle, as indicated in dot-dash lines in Fig. 2 and designated position A, the pipe 28 will be in adjacent opposition with the engaging surface 19 of the fitting 16. With further movement of the car the radial dimension between the fitting 16 and the shaft 18 will be reduced so that the fittings 16 and 32 will be forced into contact. The position of the lubricator 10 shown in solid lines in Fig. 2 is designated B and represents the position of maximum stroke of the pipe 28 as represented by the spacing between the collar 29 and the under surface of the block 26. At this position the pressure between fittings 16 and 32 is a maximum and the joint is the tightest. The spring 31 will maintain pressure between the two fittings so that during a major portion of the time interval during which the fittings are in contact and a pressure retaining fluid conduit connection is attained. Just prior to the loss of contact between the guide rod 24 and the axle 13, as indicated in dot-dash lines in Fig. 2 and designated position C, the connection between the fittings 16 and 32 will be lost so that after the car has passed, the guide rod 24 and pipe 28 may be returned to their initial position for a repetition of the lubricating cycle.

The guide rod and pipe are returned to their initial position to contact successive wheel axles by a piston operating in a cylinder 36. The piston is of the hydraulic or spring operated constant pressure type. Upon the completion of one lubrication cycle and the loss of contact between the guide rod and the axle, the piston returns the lubricator 10 to its initial position A. The piston rod 37 of the cylinder is linked to the shaft 18 through an adjustably positioned lever arm 38 which is secured to the shaft. A stop rod 40 is mounted upon the shaft 18 to cooperate with the cylinder 36 in angularly positioning the shaft 18 so that the guide rod 24 will contact an approaching car axle. The rod 40 contacts the under surface of the car 15 to limit the clockwise angular movement of the lubricator 10 when it is returned to position A, so that the guide rod 24 is in a proper angular position to bear upon the next approaching axle 13.

With the shaft 18 normal to the direction of car movement, the lineal motion of the fitting 16 and the angular motion of the fitting 32 and the pipe 28 will lie in a common plane. Likewise the angular movement of the guide rod 24 will lie in a plane parallel to the plane of the pipe movement. The angularity of shaft 18 movement between positions B and C is determined by the length of the rod 24 while the angularity of the movement between positions A and B is selected by the adjustment of the rod 40 and the cylinder 37.

The flow of lubricant through the pipe 28 to the bearing surface 17 is coordinated with the period of pressure retaining fluid flow connection between the fittings 16 and 32. As hereinafter described, the duration of lubricant flow and the rate of flow is adjustable so that the quantity of lubricant flow is metered for best results.

A shelf 41 is welded to the beam 21 beneath the shaft 18 and is arranged to support the lubricant control valve 35. A trip lever arm 42 is mounted at one end on the shelf for pivotal movement in a vertical plane. The arm is provided with a contact pin 43 projecting therethrough vertically adjacent and in general alignment with the actuating pin 44 of the control valve. In addition, a spring-loaded bolt 45 projects through the arm to contact the shelf 41 so that as the lever arm 42 is pivoted downwardly by rotation of the shaft 18, as hereinafter described, the spring is compressed. Upon the release of the pressure forcing the arm downwardly, the compressed spring of the bolt 45 will return the arm 42 to a substantially horizontal position.

The lever arm movement is obtained by the co-action of a finger follower 46 mounted for angular motion about the shaft 18 and a cam 47 positioned upon the lever arm 42. The finger is pivotally supported in a finger mounting block 48 which is adjustably mounted in a fixed position upon an extension of the guide rod 24 beneath the guide rod block 22. The finger block is constructed with a slotted recess 50 therein to accommodate the pivoted finger so that the finger rests against one wall of the recess for movement of the assembly in one direction, counter clockwise as viewed in Fig. 2. In returning the lubricator to position A the finger follower rides over the cam 47 by pivoting in a clockwise direction into the recess 50 so as to avoid depressing the arm 42 and actuating the valve 35. The finger is thereafter returned to contact with the wall of the recess by the tension spring 51 so as to be in position for a repetition of the lubricating cycle. The finger and its block are arranged on the guide rod with the pivot of the finger substantially parallel to the axis of the shaft 18. In addition, with the finger resting against the wall of the recess 50, the longitudinal axis of the finger 46 is normal to and intersects the axis of the shaft 18. The cam 47 is arranged for a sliding fit on the lever arm 42 and is adjustably secured thereon.

With the finger follower and its cam arranged as described, rotation of the shaft 18 in a counter clockwise direction, by reason of contact between the guide rod 24 and the kiln car axle 13, will cause an angular movement of the finger. The finger, bearing against the wall of the recess, will have an angular movement equal to the angular movement of the shaft 18 and will pass over the upper surface of the cam. The contact between the finger and cam will depress the lever arm 42 so that the pin 43 will open the control valve 35 for a metered flow of lubricant to the wheel bearing 17. After contact between the guide rod and the axle is lost, by reason of the continued lineal movement of the kiln car 15, the lubricator is returned to its initial position by the return piston heretofore described. During the return motion of the apparatus, the finger is pivoted into the recess 50 on contact with the cam 47 so that the lever will not be depressed to open the lubricant control valve 35. In the arrangement shown, the pin 43 is positioned so as to be non-adjustable in length, but it can be threaded for longitudinal adjustment if desired. However, longitudinal adjustment of the block 48 on the rod 24 modifies the length of stroke of the pin 44 on the control valve, and a change of position of the cam 47 on the arm 42 changes the timing of the valve opening relative to the position of the fittings 16 and 32.

A separate control mechanism (not shown) is customarily supplied with the apparatus described to prevent flooding the car journals with lubricant in case of an inadvertent car stoppage when the valve is open. This is accomplished by a cut-off valve positioned in the discharge pipe of the lubricant reservoir. The cut-off valve may be electrically or pneumatically actuated from the power source moving the kiln cars and arranged to close the valve upon any interruption of car movement.

In the operation of the described apparatus, a kiln car moving at a substantially uniform lineal velocity is drawn over the lubricator 10 in the direction shown by the arrow in Fig. 2. The guide rod 24 contacts the car axle 13 at position A and remains in contact therewith for a predetermined angular movement of the rod which causes an angular movement of the shaft 18. The extent of angular movement of the shaft can be regulated by adjusting the upward projecting length of the guide rod 24 from the shaft 18. At the initial contact of the rod with the car axle, the pipe 28, which is in spaced relationship with the rod and rotatable in a parallel plane normal to the axis of the shaft 18, will be generally in axial alignment with the lower face of the hydraulic fitting 16.

The continued lineal movement of the car will reduce the radial dimension between the fitting 16 and the shaft 18 so that pressure contact is made between the fittings 16 and 32 under the guiding influence of the member 33, whereby the spring 31 yieldably provides the pressure necessary for a pressure retaining fluid flow connection therebetween. This connection is maintained through a selected angularity of shaft rotation. The angularity of the period of contact is determined by the free length of the pipe 28 and is limited to a pipe length sufficient to permit a clearance between the fittings 16 and 32 on initial contact of the guide rod with the car axle and a fitting clearance when the guide rod disengages the car axle.

The co-acting relationship of the finger 46 and the cam 47 opens the lubricant control valve 35 during the period of leak-proof contact between the fittings 16 and 32. The relative position of the finger and the cam surface is arranged so that the maximum opening of the valve 35 occurs when the pipe 28 is perpendicular to the shaft 18 as shown in Fig. 2, position B. At this position the finger is in contact with the peak or apex of the inverted "V" shape of the cam. With a selected cam surface, such as illustrated, the angularity of shaft movement determines the period of valve 35 opening. With a known viscosity of the lubricant, a substantially uniform pressure on the lubricant reservoir and a substantially uniform lineal velocity of car movement, the flow of lubricant can be calibrated for each adjustment of the apparatus. The lubricant flow can thereafter be reproduced for each adjustment of the lubricator 10 so that the actual flow of lubricant can be metered to assure a substantially uniform and equal delivery of lubricant to each wheel bearing surface 17. After a wheel bearing has been lubricated, the piston rod 37 returns the lubricator 10 to its initial position A to contact the following wheel axle. The stop rod 40 cooperates with the piston rod 37 to angularly position the shaft 18 so that the guide rod will contact the next axle of the same or a following car.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A device for the delivery of fluid between relatively moving objects including a fluid receiver arranged for lineal movement and having a fluid flow fitting with a check valve therein positioned upon said fluid receiver, a pipe arranged for angular movement in the plane of movement of said fitting, a second fitting mounted on said pipe and arranged to engage said fluid flow fitting on said receiver in pressure retaining fluid flow relationship upon the application of axial pressure between said fittings, a guide rod in spaced angular relationship with said pipe and arranged to maintain fluid flow alignment between said fittings during the lineal movement of said receiver, a source of fluid under pressure, and means arranged to cause a metered flow of fluid through said fittings from said source of fluid to said receiver during a predetermined angular movement of said connecting pipe.

2. A device for the delivery of fluid between relatively moving parts including a fluid receiver arranged for lineal movement, a fluid flow fitting having a check valve therein positioned upon said receiver, a pipe arranged for angular movement in the plane of movement of said fitting, a second fitting mounted on said pipe and arranged to engage said fluid flow fitting in pressure retaining fluid flow relationship upon the application of axial pressure between said fittings, means for maintaining fluid flow alignment between said fittings during a period of angular movement of said pipe, a source of fluid under pressure, a finger arranged for coordinated angular movement with said pipe, a lever arranged for pivotal movement in the plane of said angular finger movement, a cam mounted upon said lever, a pin projecting downwardly from said lever, said finger and cam cooperating to depress said pin during a predetermined angular movement of said pipe, and a fluid flow valve actuated by said pin for a metered flow of said pressure fluid from said source through said pipe and fittings to said receiver.

3. A device for the metered flow of fluid between a plurality of fluid receivers arranged for movement at a predetermined rate in a lineal direction and a stationary fluid source comprising, a fluid inlet positioned upon each of said receivers and having a check valve therein, a pipe rotatable in a plane common with the lineal movement of said fluid inlet on each of said receivers, a fluid outlet upon the end of said pipe arranged to form a pressure retaining fluid flow connection with each of said fluid inlets upon each of said receivers in succession by the application of axial pressure therebetween, means for establishing and maintaining alignment between said fluid inlet and outlet during movement of said pipe and receiver through an arcuate segment of said common plane, a spring encircling said pipe for establishing a pressure connection between said fluid inlet and outlet during the arcuate movement of said pipe, a flow control valve associated with said source and coordinated for operation with the arcuate movement of said pipe for directing a flow of fluid through said pipe to said receiver, and means for returning said pipe to a position to contact and engage each succeeding fluid receiver.

4. A lubricator for a car wheel axle moving in a lineal direction comprising a lubrication fitting mounted upon said car axle and in communication with the bearing surface thereof, a shaft arranged for rotation about an axis substantially parallel to said car wheel axle, a lubricant supply pipe mounted upon said shaft and having a lubrication fitting at one end arranged to connect with said lubrication fitting on said axle, a guide rod mounted upon said shaft in spaced relationship with said pipe and arranged to bear on said car wheel axle to move said pipe and its fitting through a plane in pressure retaining alignment with the fitting on said axle, a compression spring for pressing said fittings together in pressure retaining fluid flow relationship during the arcuate movement of said supply pipe, and means for causing a flow of lubricant through said pipe and fittings to said car axle during a period of pressure retaining fluid flow connection between said fittings including a valve operated in response to the movement of said supply pipe through an adjustable arc of pipe movement.

5. A lubricator for a car wheel axle moving in a lineal direction comprising a lubrication fitting mounted upon said car axle and in communication with the bearing surface thereof, a lubricant supply source maintained under a superatmospheric pressure, a lubricant supply pipe having a lubrication fitting at one end arranged to provide a leak-proof fluid flow connection with the lubrication fitting on said axle upon the application of axial pressure thereon, a flexible tubular connection between said source and said pipe, a shaft arranged for rotation about an axis substantially parallel to said car wheel axle, a block mounted on said shaft having a bore at right angles to the axis of said shaft and arranged to slidably support said lubricant supply pipe for rotation in a plane common with the lineal movement of the lubrication fitting on said car axle, a compression spring encircling said pipe and arranged to exert an axial pressure on said supply pipe fitting upon the reduction of radial dimension between the axis of said shaft and the fitting on said receiver, a guide rod mounted on said shaft in spaced relationship to said supply pipe and arranged to rotate said shaft with the fitting on the end of the lubricant supply pipe in alignment with the fitting on said axle, a finger follower mounted on said shaft and arranged for angular movement corresponding with and equal to the angular movement of said lubricant supply pipe, a lubricant flow control valve associated with said source of supply, a lever arm having a pin thereon arranged to open said valve upon movement thereof, and a cam surface adjustably secured on said lever arm for contact with said finger follower to move said arm and actuate said valve for a regulated flow of lubricant to the fitting on said car wheel axle.

6. A device for the delivery of fluid between relatively moving objects including a fluid receiver having a fluid flow inlet fitting with a check valve therein positioned upon said fluid receiver, a pipe arranged for movement in the plane of movement of said fluid flow inlet fitting and having a fluid flow outlet fitting thereon arranged to engage said inlet fitting in pressure retaining fluid flow relationship during a period of coordinated movement, a source of fluid under pressure connected with said fluid flow outlet fitting, a guide rod mounted in driving relationship to said pipe and arranged to be driven by contact with said fluid receiver during a period of combined movement, and means associated with said guide rod causing a metered flow of fluid to said receiver during the combined movement of said receiver and said pipe.

HEYWARD RIVERS.

REFERENCES CITED

The following references are of record in the file of this patent:

UNITED STATES PATENTS

| Number | Name | Date |
| --- | --- | --- |
| 1,125,750 | Smith | Jan. 19, 1915 |
| 1,192,762 | Dodge | July 25, 1916 |
| 1,416,668 | Abbot | May 23, 1922 |
| 1,628,512 | Petersen | May 10, 1927 |
| 1,933,464 | West | Oct. 31, 1933 |

FOREIGN PATENTS

| Number | Country | Date |
| --- | --- | --- |
| 300,378 | Great Britain | Nov. 15, 1928 |
| 501,378 | Great Britain | Feb. 27, 1939 |